(12) United States Patent
Greenberg

(10) Patent No.: US 6,377,780 B2
(45) Date of Patent: *Apr. 23, 2002

(54) DEVICE FOR DISPLAYING MULTIPLE SCENES ANIMATED BY SEQUENCES OF LIGHT

(75) Inventor: Michael Greenberg, Gladstone, NJ (US)

(73) Assignee: Shelcore Inc., Somerset, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/328,786

(22) Filed: Jun. 9, 1999

(51) Int. Cl.⁷ ................................................. G09B 5/00
(52) U.S. Cl. ........................ 434/311; 434/309; 434/402; 434/426
(58) Field of Search ............................. 345/33, 39, 55, 345/57, 44, 45, 46; 434/317, 311, 314, 402, 403, 404, 426, 428, 309; 40/124.02, 550, 575, 576, 554

(56) References Cited

U.S. PATENT DOCUMENTS

| | | | |
|---|---|---|---|
| 1,618,952 A | | 2/1927 | Mayers |
| 1,890,657 A | | 12/1932 | Stonequist et al. |
| 1,993,339 A | | 3/1935 | Eschenbach |
| 2,360,212 A | | 10/1944 | Dudley |
| 2,374,341 A | | 4/1945 | Farrand |
| 3,225,460 A | | 12/1965 | Randell et al. |
| 3,637,212 A | * | 1/1972 | Hurley .................. 273/85 R |
| 3,742,631 A | * | 7/1973 | Hasala .................. 40/106.53 |
| 3,778,058 A | * | 12/1973 | Rausch .................. 463/3 |
| RE28,598 E | * | 10/1975 | Baer .................. 463/3 |
| 4,179,124 A | * | 12/1979 | Margolin .................. 463/31 |
| 4,306,226 A | * | 12/1981 | Swarbrick .................. 340/378.4 |
| 4,386,776 A | * | 6/1983 | Bromley .................. 273/85 G |
| 4,391,444 A | * | 7/1983 | Bromley .................. 273/85 G |
| 4,508,511 A | | 4/1985 | McQueen |
| 4,621,443 A | * | 11/1986 | Weinreich .................. 40/436 |
| 4,882,865 A | * | 11/1989 | Andeweg .................. 40/442 |
| 5,228,879 A | | 7/1993 | Fromm |
| 5,302,965 A | * | 4/1994 | Belcher .................. 345/31 |
| 5,461,188 A | * | 10/1995 | Drago .................. 84/600 |
| 5,474,457 A | | 12/1995 | Bromley |
| 5,609,488 A | | 3/1997 | McTaggart |
| 5,611,694 A | * | 3/1997 | Bromley .................. 434/311 |
| 5,695,345 A | | 12/1997 | Weiner et al. |
| 5,944,574 A | * | 8/1999 | Small .................. 434/311 |
| 5,971,827 A | * | 10/1999 | Lee .................. 446/81 |
| 5,979,900 A | * | 11/1999 | Goldfarb .................. 273/445 |

\* cited by examiner

Primary Examiner—Kien T. Nguyen
Assistant Examiner—Kurt Fernstrom
(74) Attorney, Agent, or Firm—Bacon & Thomas

(57) ABSTRACT

A device suitable for use as a child's toy includes a housing having a window through which is visible a medium on which are displayed changing scenes. A plurality of lights are positioned behind the medium and selectively illuminated to provide animation effects. Different portions of the medium may be selectively illuminated as the scenes are changed in order to vary the animation effects. The medium may be in the form of an at least partially translucent scroll, on which is printed a series of different scenes and which may be moved by a motor, spring, or other winding mechanism arranged to advance the scroll so that a different complete scene appears in the window each time the scroll is advanced. In addition to activating different sequences of individual lights sources each time the scenes are changed, multiple animation effects for a particular scene can be selected by the user, for example by pushing a button in response to narration coordinated with the particular scene, thereby adding a level of interactivity to the display device.

13 Claims, 4 Drawing Sheets

DEVICE FOR DISPLAYING MULTIPLE SCENES ANIMATED BY SEQUENCES OF LIGHT

BACKGROUND OF THE INVENTION

1. Field of the Invention

This invention relates to a device for displaying multiple animated scenes, and which is suitable for use as a children's toy. The appearance of animation for the different scenes is provided by illuminating sequences of lights positioned under a medium on which the different scenes are displayed. Multiple different sequences may be displayed for each scene.

In an illustrative embodiment of the invention, the scenes are printed on a scroll, and the scenes are changed by advancing the printed scroll. Different sequences of lights, with corresponding sounds, are activated each time the scroll is advanced.

2. Description of Related Art

The concept of providing the appearance of animation by illuminating a sequence of lights behind changing scenes dates back at least to U.S. Pat. No. 1,890,657, issued on Dec. 13, 1932. However, the device disclosed in U.S. Pat. No. 1,890,657 only provided a single left-to-right sequence of lights that was activated each time a scroll advanced to a new scene, greatly limiting the range of potential animation effects. Intended as a billboard or sign, rather than as a device that might be viewed repeatedly by a purchaser, the repetitive nature of the animation described in U.S. Pat. No. 1,890,657 would become monotonous if viewed repeatedly rather than just by passersby.

A similar arrangement of lights and a scroll, but with no animation, was described in U.S. Pat. No. 2,360,212. This arrangement allowed different lights to be individually activated for each scene, with the illumination of individual lights serving, as a pointer to high light portions of a displayed map, mathematical formula, or the like, in order to replace a blackboard for use in conjunction with a lecture.

The present invention is similar to the device described in U.S. Pat. No. 1,890,657 in that it provides a device in which animation is achieved by sequencing lights behind changing scenes. In addition, the illustrated embodiment of the invention utilizes a translucent printed scroll as the mechanism by which the scenes are changed. However, the present invention improves upon the device described in the above-cited patent by enabling the light sequences to be varied for the different scenes, rather than using the same light sequence for each scene. The present invention is also similar to the device disclosed in U.S. Pat. No. 2,360,212 in that each scene may be illuminated by different lights, but unlike the device disclosed in U.S. Pat. No. 2,360,212, the lights are individually sequenced for each scene, so that different animation effects may be provided.

It has recently become known to provide non-illuminated scrollable or scene-changing devices with corresponding synchronized audio for use as children's toys. Examples of devices arranged to display changing scenes with corresponding audio messages but no animation effects are disclosed in U.S. Pat. Nos. 5,695,345 and 5,474,457. In addition, Tiger Electronics, Inc. currently sells a device known as the Pooh Learning Theater™ which, when turned on, talks a child through a play pattern of changing non-animated scenes, in which the child responds to audio prompts by pressing buttons, and is rewarded for correct responses by audio messages and corresponding scene changes, providing a level of interactivity that enhances learning and holds the child's interest for an extended period of time.

When applied to a child's toy, and in particular an interactive learning toy similar to the Pooh Learning Theater™, the present invention in intended to further enhance learning by providing additional rewards for responses. Unlike illuminated infant toys, which play the same sequence of lights over and over again, the device of the present invention provides enough variability to hold an older child's interest, while adding an element of surprise that will cause a child of pre-school age to repeatedly work through the play pattern, increasing the learning effect in comparison with prior non-animated devices.

When applied in other contexts, it is believed that a similar attention-holding effect will be obtained relative to, for example, the less variable or interesting back-lit scene-changing devices disclosed in U.S. Pat. Nos. 1,890,657 and 2,360,212. The longer the viewer's attention can be fixed on, for example, an advertising display, even if the difference is a matter of seconds, the better the chance that the message will be remembered.

SUMMARY OF THE INVENTION

It is accordingly an objective of the invention to provide a device for displaying multiple scenes, in which the appearance of animation is provided by sequential illumination of lights, and in which the illumination sequence can be varied from scene-to-scene, the illumination sequences being individually preset or programmable to suit each scene.

It is a further objective of the invention to provide a device for displaying multiple scenes in which the appearance of animation is provided by different sequences of lights for each scene, or multiple selectable sequences per scene, and which is suitable for use in a child's toy.

It is a still further objective of the invention to provide a multiple-scene interactive child's toy that rewards the child with animation effects as well as audio effects.

It is yet another objective of the invention to provide a device for displaying multiple animated scenes which is simple to assemble, durable, and provides sufficient variability to hold the attention of a viewer for extended periods.

These objectives are achieved, in accordance with the principles of a preferred embodiment of the invention, by providing a device having a housing in which is provided an at least partially translucent scroll on which is printed a series of different scenes viewable through an opening or window in the housing, the scroll being preferably movable from scene-to-scene by a motor, although a spring actuated mechanism and other suitable winding arrangements are also within the scope of the invention. Behind the opening or window through which the scenes are viewable is a lighting arrangement made up of multiple individually activatable light sources arranged to shine through the scroll, different sequences of individual light sources being activatable as the scroll is moved from scene to scene.

Although the preferred embodiment of the invention utilizes a translucent scroll to accomplish scene changing, it will be appreciated by the those skilled in the art that the concept of animating changing scenes by illuminating the changing scenes with different sequences of lights could also be applied to, for example, a device in which the changing scenes were provided on a liquid crystal display, and the sequences of lights were arranged to shine through the display, or a mechanism involving changing slides or other translucent media.

Preferably, a sequencing controller in the form of an integrated circuit is provided that also controls a sound generating device for providing narration or instructions to lead a viewer from scene to scene. The controller may provide a single animation sequence for each scene or multiple animation sequences selectable by the user, and may provide more complex capabilities such as the ability to remember buttons pressed and to vary possible choices and the corresponding sound accordingly.

In the illustrated embodiment of the invention, the preferred device is an interactive learning toy, although the invention is not, in principle, limited to child's toys, or to the particular form illustrated, but rather may be combined with other toys, advertising displays, road maps, and so forth.

DETAILED DESCRIPTION OF THE PREFERRED EMBODIMENTS

Figure 1:
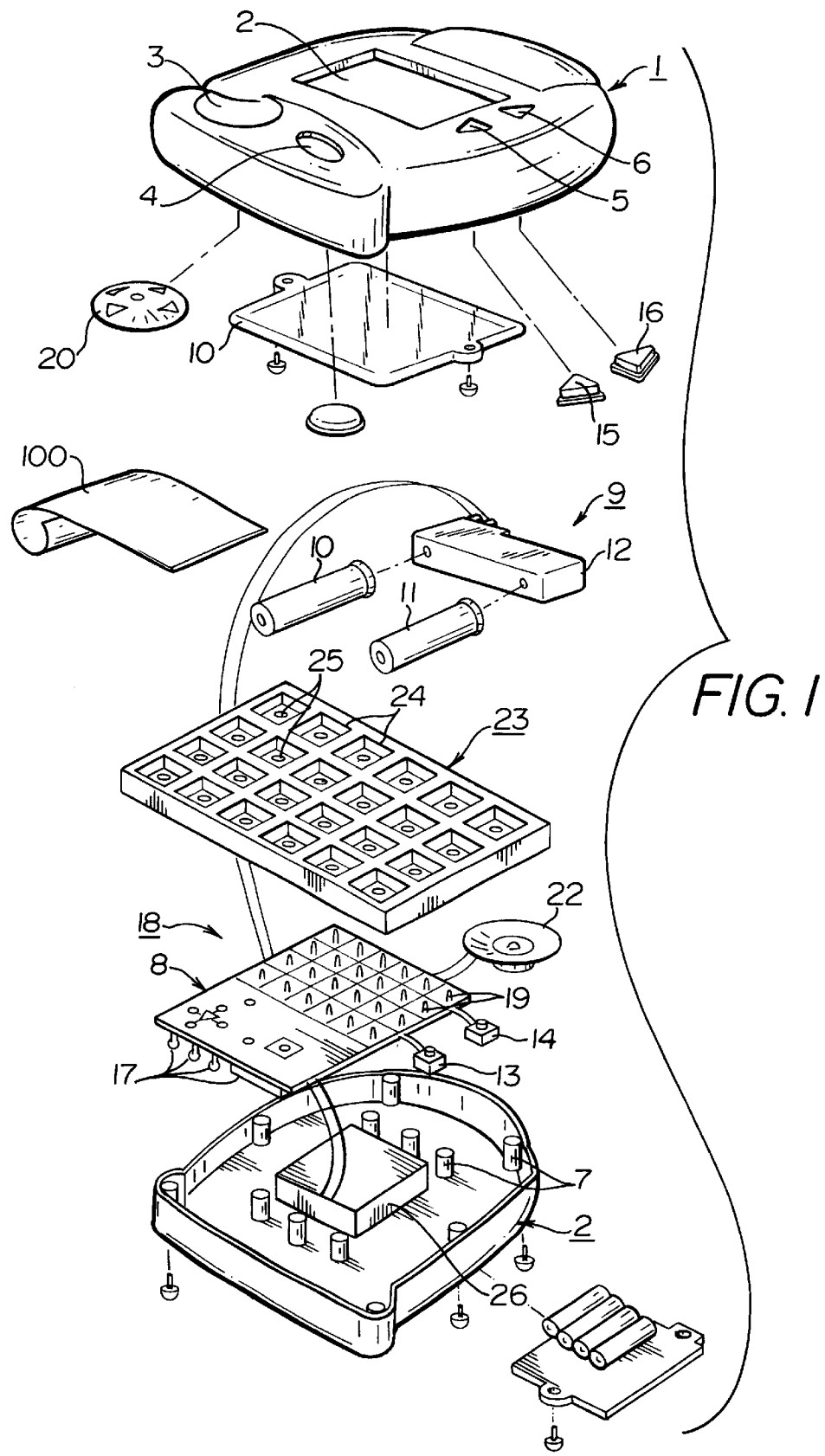
FIG. 1 is an exploded isometric view of an animation display device constructed in accordance with the principles of a preferred embodiment of the invention.

As illustrated in FIG. 1, the animation display device of the preferred embodiment of the invention includes a housing made up of front and back housing parts 1 and 2, which fit together to house and protect the remaining components of the device. Housing part 1 includes a window 2 through which animated display scenes are to be viewed, and openings 3–5 for various control devices or buttons to be described below. While the size and shape of the housing made up of housing parts 1 and 2, as well as the number of housing parts, may be varied to suit the application in which the display device is used, the illustrated housing has a shape and dimensions, that enable the device to be easily handled by a child. A suitable material for the housing is plastic.

Housing parts 1 and/or 2 may includes various molded-in features 7 that facilitate attachment of housing parts to each other, and the mounting of the components of the display, including a main circuit board 8 and scrolling mechanism 9. In addition, housing part 1 may include a clear plastic insert 10 to protect the scroll as it passes in front of the window 2, although those skilled in the art will appreciate that the insert may be eliminated or modified to, for example, include printing, multiple panels, and other decorative features.

Except for the inclusion of the light grid and corresponding modification of the controller circuitry, the elements illustrated in FIG. 1, including the housing, scrolling mechanism, power supply, and audio components, may be similar to those of existing commercially available talking books or interactive learning toys that use scrollable scenes and accompanying sounds, although it will be appreciated by those skilled in the art, the invention is not limited to interactive children's toys, but may be modified to be used as advertising displays, informational signs, maps or guides, and so forth.

The scrolling mechanism 9 used to change scenes is made up of a lead and take-up rollers 10 and 11 mounted on suitable supports (not shown), an electric motor/gearbox 12 into which one end of corresponding roller shafts or axles extend, and forward/reverse motor activation switches 13. Switches 13 are engaged by buttons 15 and 16 which extend respectively through openings 5 and 6 in housing part 1 to permit the user to activate the motor and there cause respective rollers to rotate in forward or reverse directions to change scenes. Wound on the two rollers is a translucent scroll 100 on one side of which are printed successive scenes, each of which is approximately the size of the window 2 so that the whole scene can be viewed through the window 2 when the scroll is moved accordingly.

Examples of different scenes that might be printed on the scroll are illustrated in FIGS. 2–4, 5A, 5B, 6A, and 6B and described below. The scroll itself may be made of a synthetic paper painted black on a side opposite the window and colored icons or figures printed at locations where the black backing has been removed or masked out on the front side of the scroll corresponding to locations that can be illuminated when the scroll is appropriately positioned.

Those skilled in the art will appreciate that in order to ensure that the motor stops at appropriate points so as to enable entire scenes to be viewed through window 2, the motor controller may be programmed to move the motor through a predetermined number of rotations, a detent may be provided that stops the scroll at a particular point, or an indicator of where to stop may be provided on the scroll itself. A suitable indicator might be a mechanically or optically sensed cut-out, or a magnetic or capacitive marking.

Alternatively, those skilled in the art will appreciate that motor configurations other than the illustrated combination motor/gearbox 12 may be used to move the rollers, and that the motor/gearbox 12 may be replaced by a lever-activated, spring activated, or winding mechanism similar to those used in simple film cameras, and that moves the scroll a predetermined amount with each movement of the lever or release of a catch or stopper.

All of the above variations, and any other motor arrangement, mechanism, circuit, or program used to move and stop a scroll at a desired location is intended to be included within the scope of the invention, including those used in conventional non-animated interactive scrollable toys, and those in which the point of stoppage is controlled solely by the user.

Main circuit board includes, on the back side, motor and light control circuitry 17 including a control circuit, and on the front side a light grid 18 in the form of a plurality of lights 19 arranged in a grid pattern. It is of course within the scope of the invention to arrange the lights in any desired pattern, and to mount them on a board separate from the main circuit board 8, or in any other convenient manner. The lights 19 may be incandescent bulbs, light emitting diodes, or any other suitable lighting elements that can be sequentially activated. Board 8 includes traces (not shown) that enable the lights to be individually activated by the controller. The control circuit is preferably in the form of an integrated circuit similar to the ones currently used to control non-illuminated interactive displays of the type mentioned above, with the addition of light sequencing options. Alternatively, a separate sequencing circuit may be provided, with connections to the main controller so that the sequences can be coordinated with positioning of the scroll at the different scenes.

As illustrated, light grid 18 includes 24 individual lights 19 which can be arranged into up to four different sequences per scene. The selection of different light sequences for a scene may be accomplished by a control button 20 mounted at a location corresponding to opening 3 in front housing part 1. Control button 20 enables the user to select one of four options in response to prompting from accompanying narration. A select button 21 positioned at a location corresponding to opening 4 in the front housing may also be provided for use as a function select button, for example to begin narration, or provide further control or reply options.

One way of coordinating scenes to sequences of lights would be to use a register to count forward or reverse frame advances according to activations of the motor by the user. Each scene is assigned a number and the sequences available to the controller are determined by the number of the current scene, which changes each time the scroll is moved to a new scene. Alternative ways of synchronizing sounds and sequences with current scenes may also be employed, for example by including magnetic indicators on the scrolls, either on a frame-by-frame basis, or on a portion of the reels so that the different programmed series of sequences can be effected when the scrolls are changed.

In the case of a mechanical scroll advance, the current frame could be registered by pushing a button that also releases the scroll to advance one frame in response to spring, or by movement of a lever that advances the frame. Alternative mechanical or electro-mechanical ways of registering a frame advance would also be within the scope of the present invention.

Narration and other audio effects, including background music and sound effects, are controlled in conventional fashion by the above-mentioned integrated circuit in coordination with movement of the motor, the sound signals generated by the integrated circuit or an audio signal storage device such as a EEPROM being supplied to a speaker 22 mounted in the housing. Alternatively, two or more speakers could be included for improved sound effects. The manner in which the narration or audio effects are synchronized with the different scenes and pressing of the direction and select buttons forms no part of the present invention, and may be freely varied by those skilled in the art without departing from the principles of the preferred embodiment.

In order to ensure that only the intended icons or figures are illuminated by activation of particular lighting elements 19, a grid member 23 made up of a planar member with openings 24 corresponding to each of the lighting elements, the openings including at their base apertures 25 shaped to correspond to the shapes of the lighting elements. The grid member 23 is positioned between the circuit board 18 and the window 2 or protective member 10, and shields areas surrounding individual illuminated lighting elements so that only a specific portion of the scene is illuminated by any one lighting element, thereby enhancing the lighting effects.

Finally, the housing, and in particular housing part 2, may also includes a battery compartment 26 with appropriate terminals and connections to circuitry on the main circuit board 8. Those skilled in the art will appreciate that the power supply could also include a transformer or inverter circuit to permit AC input, or any other circuitry or elements necessary to power the controller circuitry, lights, and motor/gearbox 12.

Figure 2:
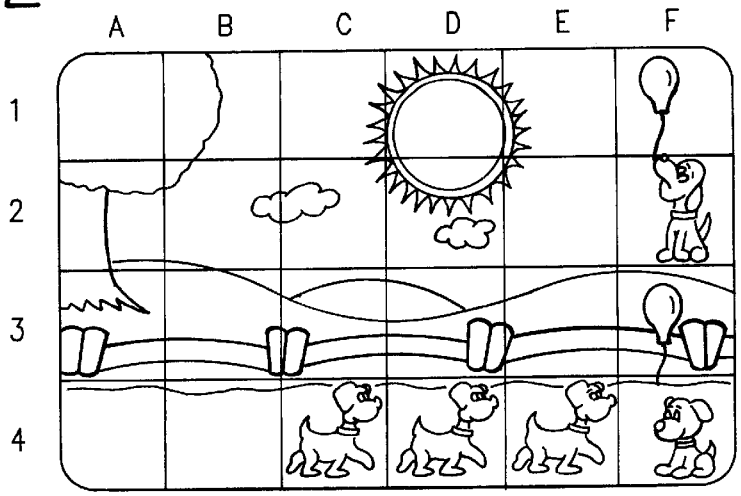
FIGS. 2–4 illustrate examples of different scenes with different animation effects, for use in the display device of the preferred embodiment illustrated in FIG. 1.
Figure 3:
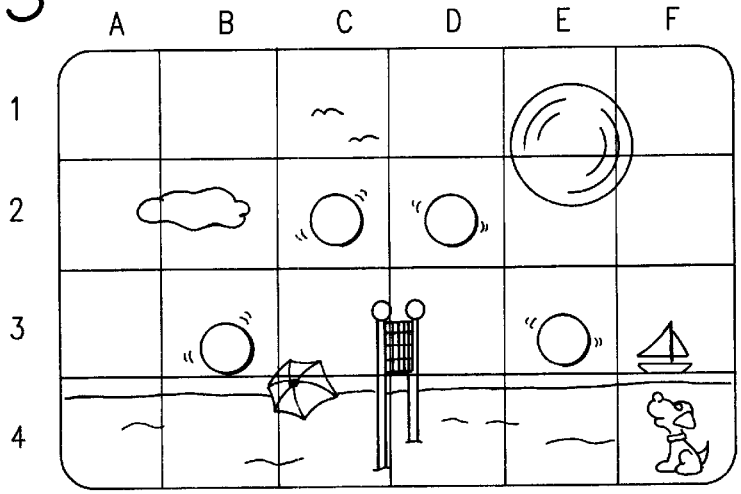
Figure 4:
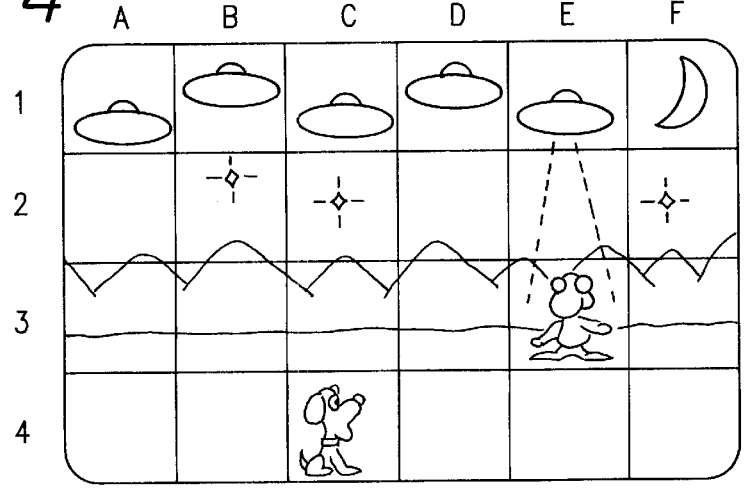

Examples of different scenes with different lighting effects are illustrated in FIGS. 2–4. Each scene has 24 segments arranged in six columns designated by the letters A to F, and four rows designated by numbers 1 to 4. The grid lines would of course generally not be included in an actual product. In the scene illustrated in FIG. 2, for example, pictures of a walking dog are situated in segments C4–C6, a drawing of the same dog with a balloon is shown in segments F3 and F4, and a drawing of the dog being carried away by the balloon is illustrated in segments F1 and F2. The animation involves illuminating segments C4, C5, C6, F3/F4, and F1/F2 in sequence, giving the appearance of the dog walking across the bottom of the display, taking the balloon and floating up in the air.

Similar animations are shown in FIGS. 3 and 4, but with different sequences. In the scene shown in FIG. 3, the animation involves a repeated sequence of segments B3, C2, D2, E3, D2, C2, B3, . . . , to give the ball the appearance of a ball in motion, while in the scene illustrated in FIG. 4, a sequence of segments A1–E1 and then E3 might be used to make the space ship appear to fly across the top of the screen and project the alien to the ground.

Figure 5B:
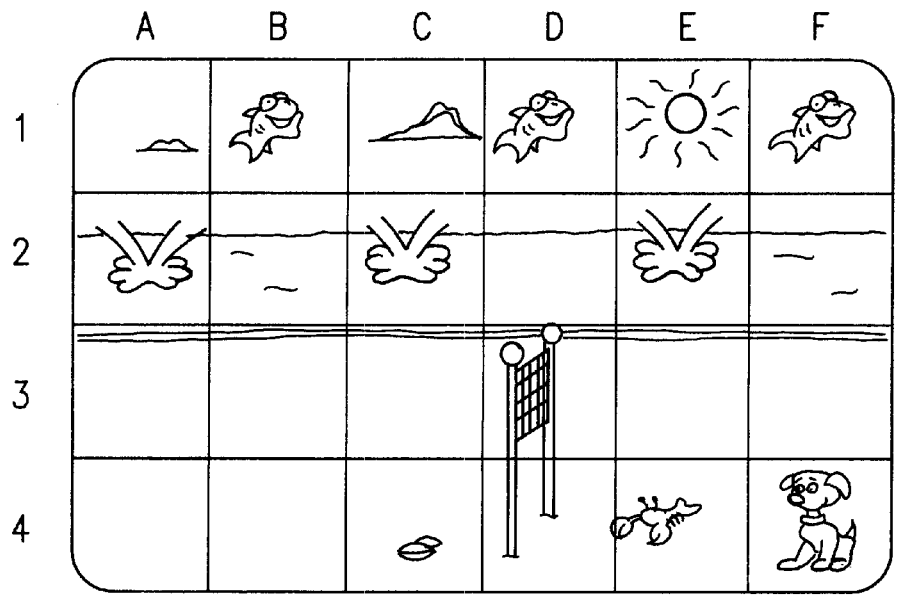
FIGS. 5A and 5B illustrate an example of a single scene with two different animation sequences.
Figure 5A:
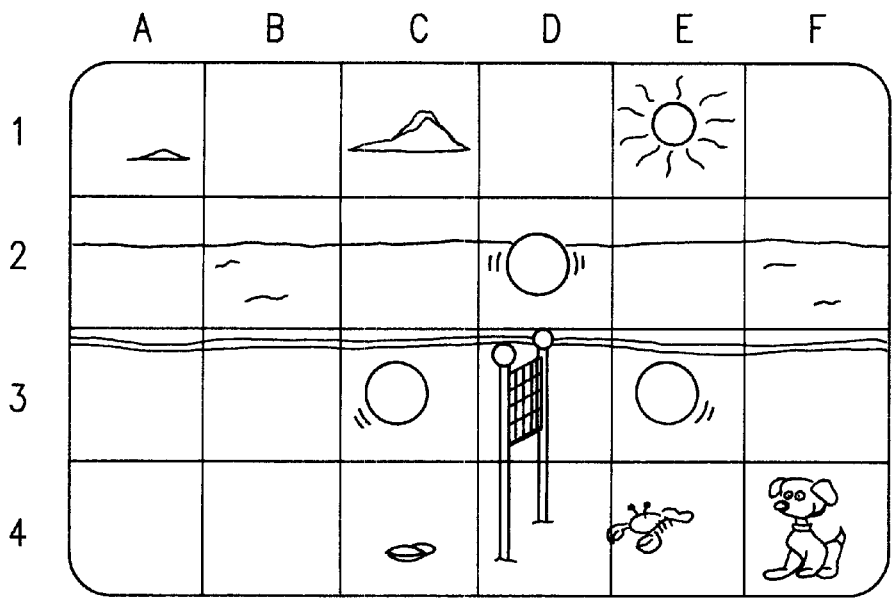

In the arrangements illustrated in FIGS. 5A/5B and 6A/6B, two animation sequences are possible for each scene. In the beach scene illustrated in FIGS. 5A and 5B, the user is given a choice of selecting first or second options via button 20, which might for example be labelled with different colors or numbers, the first option being to watch the fish play, in which case segments A2, B1, C2, D1, E2, and F2 would be illuminated in sequence to show the jumping fish illustrated in 5B, and the second option being to play ball with the dog, in which case segments C3, D2, E3, and D2 again would be repeatedly illuminated to give the effect of motion to the ball illustrated in FIG. 5A. The jumping fish and bouncing ball could optionally be accompanied by appropriate sound effects such as splashing, bouncing, or dog barking sounds, together with appropriate voice-based narration. In addition, such elements as the sun, clouds, and dog could be constantly illuminated if desired.

Figure 6B:
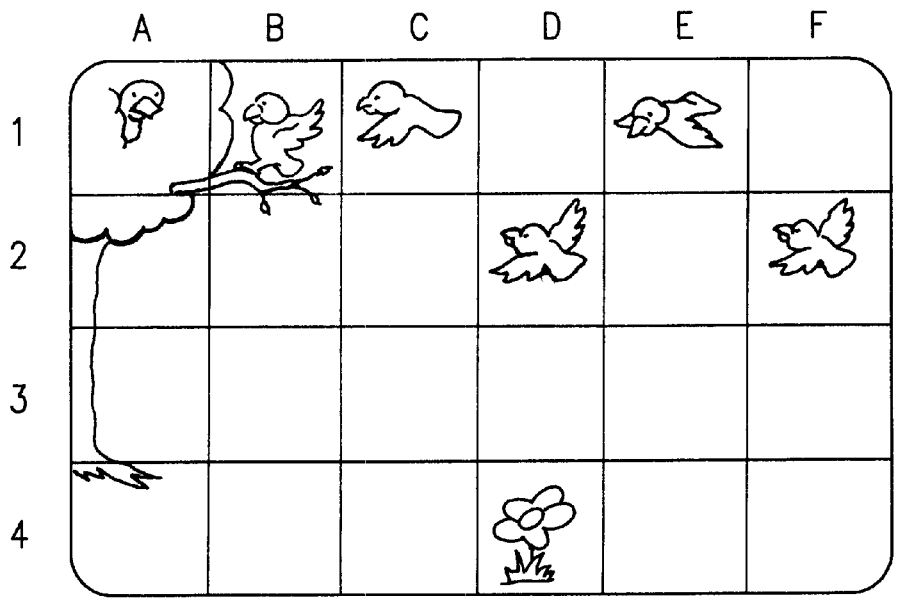
FIGS. 6A and 6B illustrate a further example of a single scene with two different animation sequences.
Figure 6A:
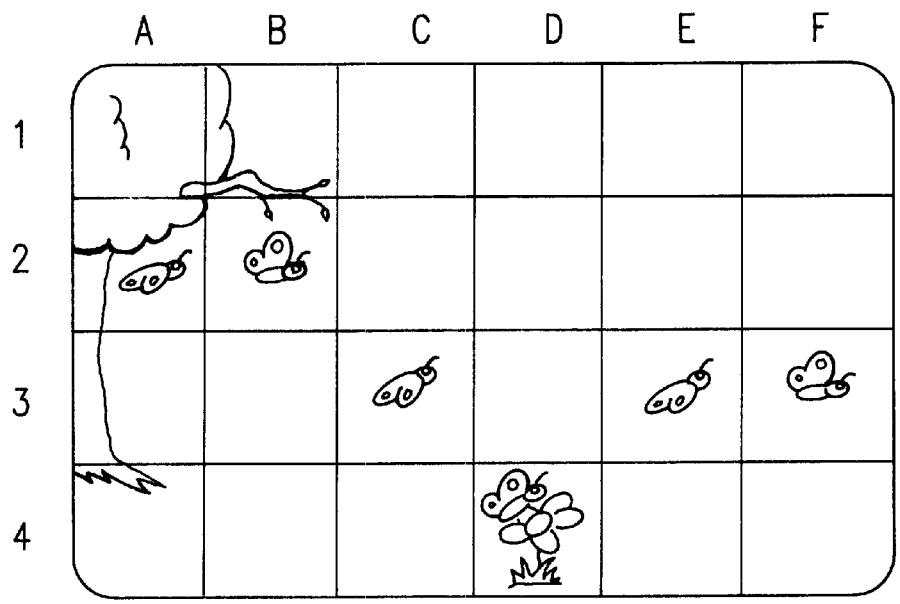

In the alternative scene shown in FIGS. 6A and 6B, the user would be prompted by narration to select an option corresponding to a bird flying, in which case segments F2, E1, D2, C1, and B1 might be illuminated, or a butterfly flying, in which case segments A2, B2, C3, D4, E3, and F3 could be illuminated in sequence. In order to give the impression of the butterfly alighting on the flower, illumination of segment D4 might be prolonged for several seconds. In addition, although not illustrated, two additional animation sequences could be provided for the respective scenes illustrated in FIGS. 5A/5B and 6A/6B using the four position button 20 illustrated in FIG. 1. Alternatively, more complex or numerous input devices might be combined with a greater number of lighting elements to greatly increase the number of possible lighting sequences per scene.

It will of course be appreciated that the content of the scenes may be varied as desired for creative, informational, and educational purposes, and that the scenes shown in the appended drawings are not intended to be limiting in any way. Examples of other types of scenes which might be included in a device corresponding to that of the preferred embodiment include combat scenes, for example as viewed from the cockpit of a jet fighter, or scenes viewed from the perspective of a race car driver.

Furthermore, the principle of animating different sequences of lights behind changing scenes may be applied to scenes on media other than translucent paper, including photographic transparencies and even liquid crystal or other at least partially translucent electronic display media, and that the scenes may be changed by mechanisms other than scrolling, such as rotation of a disc, use of a changing or jukebox mechanism, or in the case of a liquid crystal or similar display, appropriate circuitry.

Having thus described a preferred embodiment of the invention with sufficient particularity to enable those skilled in the art to easily make and use the invention, and having described several possible variations and modifications of the preferred embodiment, it should nevertheless be appreciated that still further variations and modifications of the invention are possible, and that all such variations and modifications should be considered to be within the scope of the invention. Accordingly, the scope of the invention should not be limited by the above description, but rather should be interpreted solely in accordance with the appended claims.

I claim:

1. A device for displaying multiple scenes, comprising:
   a housing having a window through which at least one scene is viewed;
   a medium having a first side on which a plurality of scenes including said at least one first scene are displayed;
   scene changing means for moving said medium to present said at least one first scene for viewing through said window, and for further moving said medium to change scenes by replacing said at least one first scene with at least one different scene for viewing through said window such that said at least one first scene is no longer visible through said window;
   a plurality of lights positioned on a second side of said medium such that the medium is present between the lights and the window at least some of said lights being visible through said medium; and
   means for selectively illuminating a first sequence of said lights when said at least one first scene is presented for viewing through said window, and for illuminating a second sequence of said lights when said at least one different scene is presented for viewing through said window,
      wherein said first sequence of said lights includes different lights than said second sequence of said lights, and
      wherein said first sequence of said lights and said second sequence of said lights are visible through said medium to thereby provide different animation effects when different scenes are displayed in said window.

2. A device as claimed in claim 1, further comprising an input element arranged to enable selection by the user of different lighting sequences for each scene.

3. A device as claimed in claim 2, wherein the input element is a multiple position button.

4. A device as claimed in claim 3, further comprising a controller arranged to provide narration coordinated with a particular scene and to prompt the user to select one of said different lighting sequences by pushing said button.

5. A device as claimed in claim 1, wherein the medium is an at least partially translucent scroll on which is printed a series of different scenes viewable through said window, the scroll being wound on rollers that are movable to advance the scroll and thereby vary the scenes that appear through the window.

6. A device as claimed in claim 5, wherein the scene changing means includes a motor, and wherein the scroll is arranged to be moved from scene-to-scene by said motor.

7. A device as claimed in claim 1, further comprising a grid member having openings corresponding to positions of individual lights, the grid member being arranged to shield adjacent lights so that illumination of any one light illuminates only a predefined portion of a scene.

8. A device as claimed in claim 1, further comprising an audio circuit and at least one speaker for providing narration to accompany changing scenes.

9. A device as claimed in claim 1, wherein said plurality of lights are mounted on one side of a main circuit board positioned in said housing, said main circuit board also including control circuitry and connections to a battery power supply.

10. A device as claimed in claim 1, further comprising an audio circuit and at least one speaker for providing sound effects to accompany changing scenes.

11. A device as claimed in claim 1, wherein said means for selectively illuminating said first and second sequences of said lights includes a main controller arranged to coordinate illumination of said first and second sequences of lights with movement of said medium to present respective said first and different scenes for viewing through said window.

12. A device as claimed in claim 1, further comprising register means for counting activations of said scene changing means, wherein said means for selectively illuminating said first and second sequences of said lights is arranged to select said first and second sequences based on a number of activations counted by said register means.

13. A device as claimed in claim 12, wherein said register means includes means for detecting movement of said scene changing means.

* * * * *